United States Patent

Yashiro

[11] Patent Number: 5,530,635
[45] Date of Patent: Jun. 25, 1996

[54] POWER SUPPLY

[75] Inventor: Hiroyuki Yashiro, Nagaoka, Japan

[73] Assignee: Nemic-Lambda Kabushiki Kaisha, Japan

[21] Appl. No.: 136,171

[22] Filed: Oct. 12, 1993

[30] Foreign Application Priority Data

Oct. 12, 1992 [JP] Japan .................................. 4-273248

[51] Int. Cl.$^6$ ........................................... H02M 7/23
[52] U.S. Cl. ........................ 363/65; 363/71; 323/205
[58] Field of Search ............................. 323/205; 363/15, 363/16, 650, 71

[56] References Cited

U.S. PATENT DOCUMENTS

| | | | |
|---|---|---|---|
| 3,913,002 | 10/1975 | Steigerwald et al. | 323/205 |
| 4,652,769 | 3/1987 | Smith et al. | 307/31 |
| 4,680,689 | 7/1987 | Payne et al. | 363/26 |
| 4,783,728 | 11/1988 | Hoffman | 363/71 |
| 5,001,620 | 3/1991 | Smith | 363/72 |
| 5,019,717 | 5/1991 | McCurry et al. | 363/65 |
| 5,019,954 | 5/1991 | Bourgeault et al. | 363/71 |
| 5,113,337 | 5/1992 | Steigerwald et al. | 363/71 |
| 5,184,025 | 2/1993 | McCurry et al. | 363/65 |
| 5,216,351 | 6/1993 | Shimoda | 323/224 |
| 5,224,029 | 6/1993 | Newman | 363/48 |
| 5,404,092 | 4/1995 | Gegner | 363/65 |

FOREIGN PATENT DOCUMENTS

| | | | |
|---|---|---|---|
| 63-23564 | 3/1988 | Japan | H02M 3/155 |
| 64-60261 | 3/1989 | Japan | H02M 3/155 |
| 2244155 | 11/1991 | United Kingdom | G05F 1/575 |

*Primary Examiner*—Jeffrey L. Sterrett
*Attorney, Agent, or Firm*—Quarles & Brady

[57] ABSTRACT

Disclosed is a power supply which can be optionally designed in accordance with the objects. Main parts constructing a power supply are divided into noise filter module 3, power factor and harmonic correction module 4, D.C./D.C.converter 5, back-up power supply module 7, and the like. Each module is optionally combined and connected to one another, thus a user can freely design a power supply depending upon the various specifications thereof.

9 Claims, 4 Drawing Sheets

POWER SUPPLY

BACKGROUND OF THE INVENTION (a) Field of the Invention

The present invention relates to Power Supply in which a preset D.C.output voltage can be obtained from A.C.input voltage.

(b) Description of Prior Art

In general, Power Supply of such kind as Switching Power Supply is so structured that after obtaining D.C.input voltage by rectifying and smoothing A.C.power source supplied across a filter circuit, said D.C.input voltage is supplied to an inverter in order to optionally output stabilized D.C.voltage.

In recent years, power factor and harmonic correction circuit comprising boost-chopper type converter has come to be integrated into the Power Supply, to achieve better efficiency in energy consumption, and improve the power factor for the correction of electricicity distortion and voltage drop of transmission voltage.

However, in the aforesaid prior art, on one board are mounted discrete parts such as resistors, capacitors, transistors, transformers, diodes, or the like, and integrated circuit (i.e.I.C.) for control of the inverter, thus a user cannot newly design the once packaged Power Supply to obtain another input or output voltage and output power. As the result, such Power Supply lacks the flexibility in use a great deal.

SUMMARY OF THE INVENTION

Accordingly, it is the main object of the present invention to provide a Power Supply which can realize optional design of the same, depending upon the objects thereof.

In accordance with a major feature of the present invention, there is provided a structure for a Power Supply comprising:

a noise filter module for rejecting noises from A.C.input voltage line;

a rectifying modules for rectifying and smoothing said A.C.input voltage to output D.C.input voltage;

one or more power factor and harmonic correction modules for bringing the current and voltage waveforms of said A.C.input voltage close to each other in order to output D.C.input voltage;

one or more power converter modules for converting said D.C.input voltage into preset D.C.output voltage;

a back-up power supply module for supplying D.C.input voltage to said power converter modules.

With the structure described above, each main part constructing a Power Supply can be divided into each independent module, thereby each module can be optionally combined to design a desirable Power Supply in accordance with various specifications thereof.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which.

DESCRIPTION OF A PREFERRED EMBODIMENT

Hereinafter is explained a first embodiment of the invention with reference to FIGS. 1 to 4.

Figure 1:
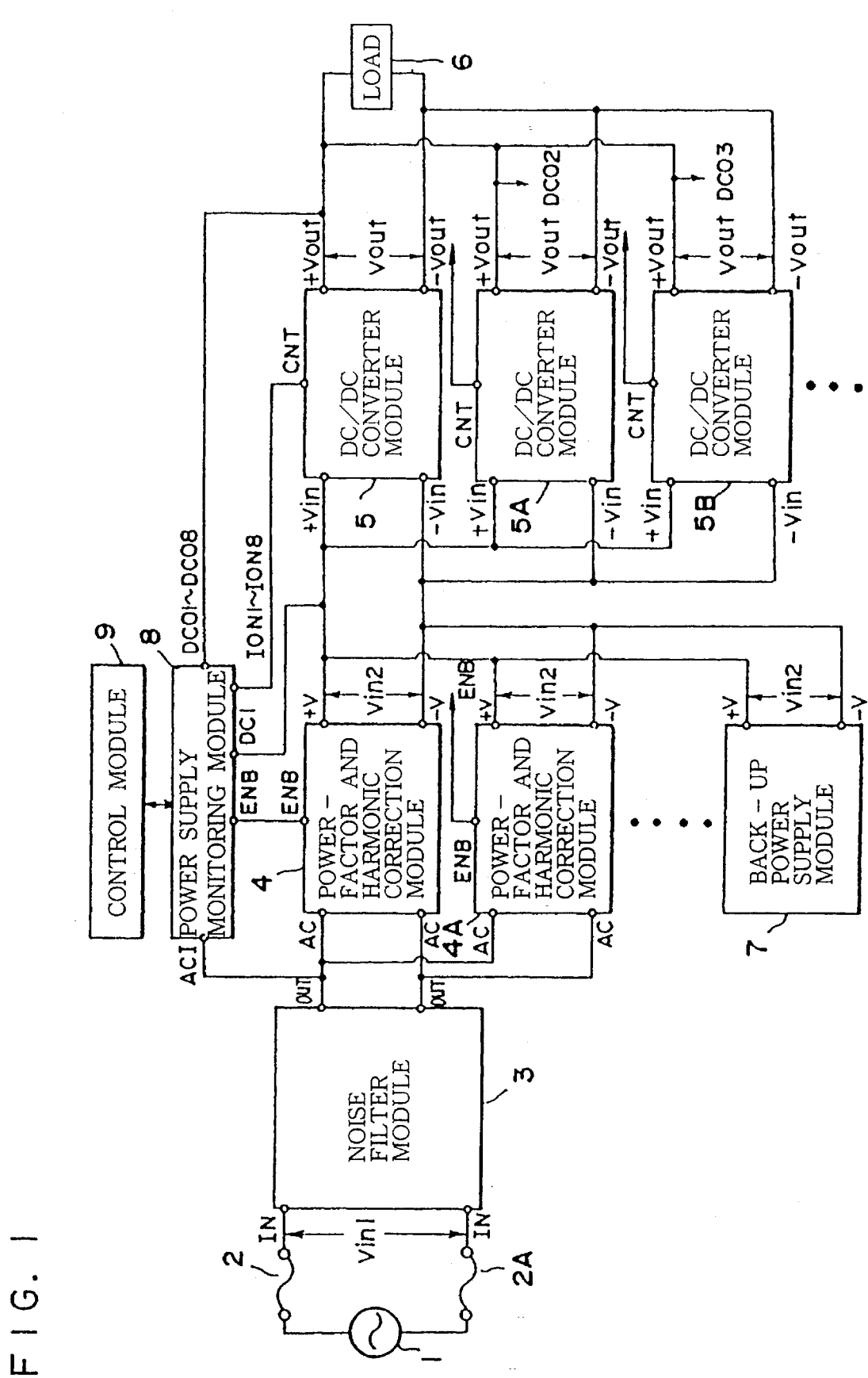
FIG. 1 is a circuit diagram showing a first embodiment of a Power Supply of the present invention.
Figure 2:
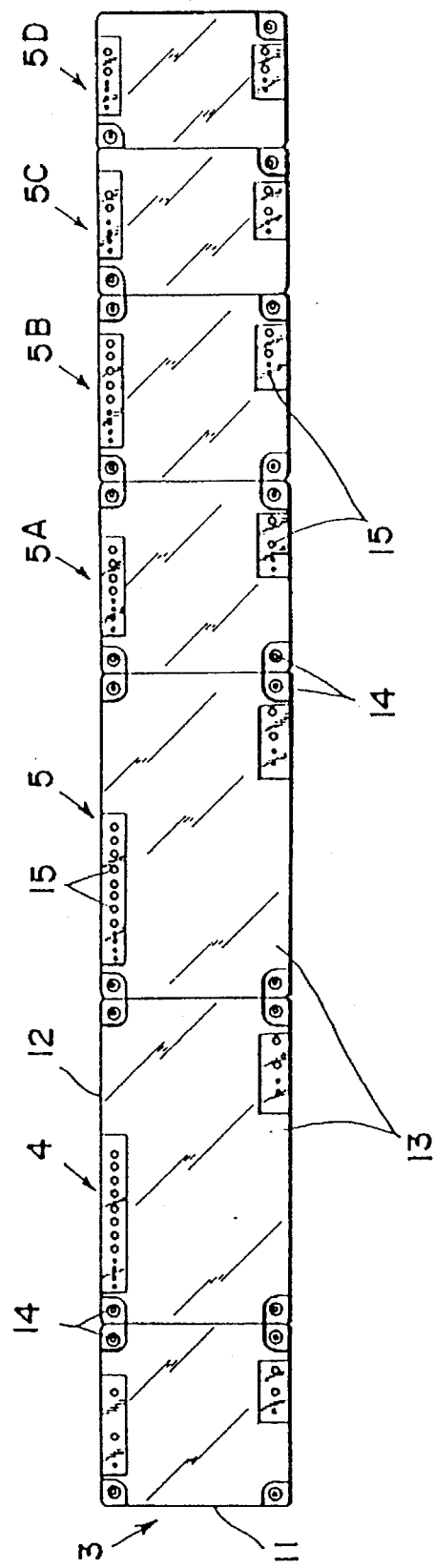
FIG. 2 is a general front view showing a first embodiment of a Power Supply of the present invention.
Figure 3:
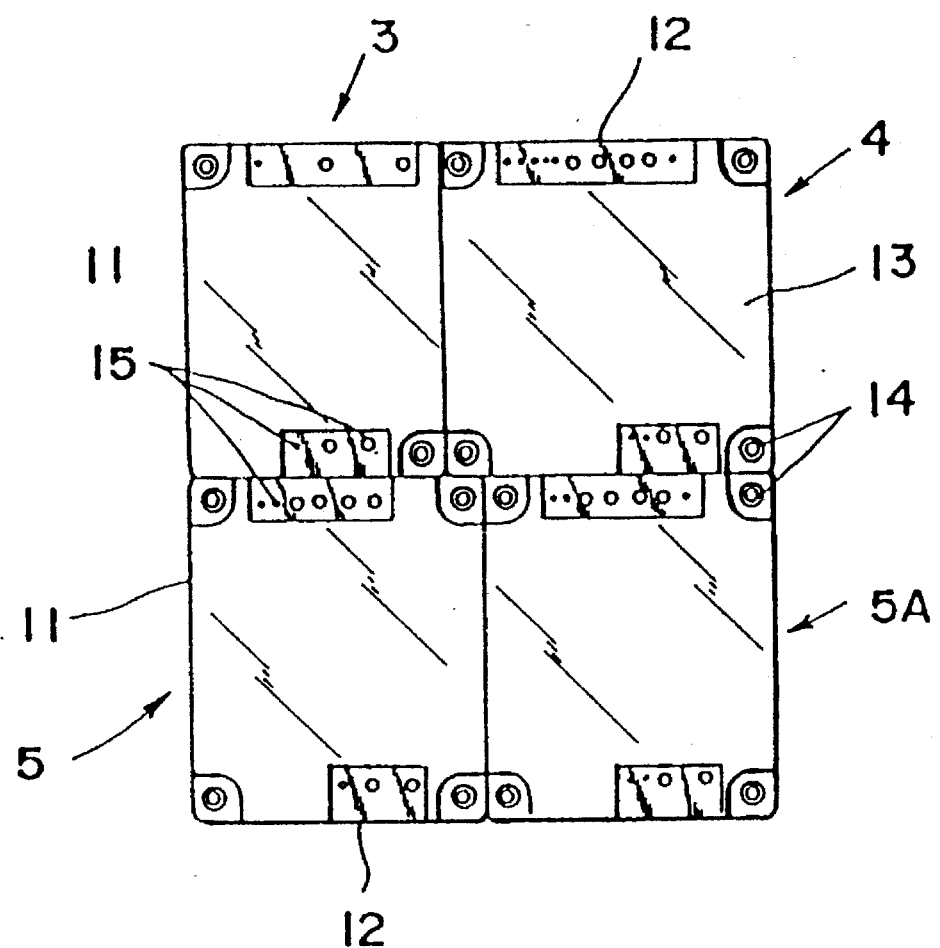
FIG. 3 is another general front view showing a first embodiment of a Power Supply of the present invention.

FIGS. 1 to 3 show a first embodiment of the invention. In FIG. 1 showing a general circuit structure of the present Power Supply, reference numeral 1 designates A.C.power source, 2 and 2A designate fuses respectively, in which A.C.input voltage Vin1 from A.C.power source 1 is applied to each input terminal of noise filter module 3 across said fuses 2,2A.

Said noise filter module 3 integrates conventional noise filter circuit therein to suppress or cut-off the noise entering the line of A.C.input voltage Vin1. And from the output terminals OUT of the noise filter module 3 is output D.C.input voltage Vin1 from which are eliminated the noise within a preset frequency band. Reference numerals 4,4A designate power factor and harmonic correction modules serving as a A.C.front end of power converter modules or D.C./D.C.converters 5,5A,5B described hereinafter.

Said power factor and harmonic correction modules 4,4A are provided with rectifier circuit and boost-chopper type converter and the like therewithin respectively, which can bring the current and voltage waveforms of A.C.input voltage Vin1 applied to the input terminals AC close enough to each other, and correct the harmonic current from the A.C.input voltage Vin1 in order to output D.C.input voltage Vin2 from output terminals +V,–V.

Further, a plurality of power factor and harmonic correction modules 4,4A for various input or output voltages and output powers are provided in accordance with said A.C.input voltage Vin1 or the output power of D.C/D.C.converters 5,5A, whereby said power factor and harmonic correction modules are optionally used in a single or parallel connection thereof. Furthermore, said each power factor and harmonic correction modules 4,4A detects D.C.input voltage Vin2 so that detection signals can be supplied from detection terminals ENB when the voltage level reaches predetermined value thereof.

Each reference numeral 5,5A,5B is provided for D.C.back end, which is D.C./D.C.converter module having a plurality of kinds for various input or output voltages and output powers. To each input terminal +Vin,–Vin of said D.C./D.C.converters 5,5A,5B is supplied said D.C. input voltage Vin2 respectively, in which D.C. input voltage Vin2 is inverted into D.C.output voltage Vout by inverter module (not shown) integrated therewith, and then said D.C.output voltage Vout is supplied to common load 6 across output terminals +Vout,–Vout.

Besides a single operation of one D.C./D.C.converter module 5, where necessary, a parallel operation of a plurality of D.C./D.C. converters 5,5A,5B having the same output characteristics will be possible, as shown in FIG. 1. Further, multi-outputs operation of D.C./D.C.converters 5,5A,5B having the different output characteristics can be also possible, which is not shown herein.

Each D.C./D.C.converter 5,5A,5B is further provided with each control terminal CNT for remote on/off control of said D.C.output voltage Vout. Namely, when each control terminal CNT and input terminal −Vin is in an open state, said inverter will be forced to stop, so that the supply of D.C.output voltage Vout to load 6 can be shut down. Whereas, when each control terminal CNT and input terminal −Vin is in a short-circuit state, said inverter will be controlled so that stabilized D.C.output voltage Vout can be supplied.

On the other hand, reference numeral 7 is an optional unit for Power Supply, designating a back-up power supply module connected in parallel with said power factor and harmonic correction modules 4,4A. Said back-up power supply module 7 allows D.C.input voltage Vin2 to be supplied from output terminals +V,−V to each input terminal of each D.C./D.C.converter module 5,5A,5B when the supply of D.C.input voltage Vin2 is stopped because of some abnormal operations.

Reference numeral 8 designates a power supply monitoring module for simultaneously observing both the input and output sides of Power Supply, which comprises a detection terminal AC1 connected to the line of A.C.input voltage Vin1 for detecting A.C.input voltage, another detection terminal DC1 connected to the line of D.C.input voltage Vin2 for detecting D.C.input, another detection terminal ENB connected to the detection terminals ENB of said power factor and harmonic correction modules 4,4A for suppressing secondary rush current, and eight detection terminals DC01 to DC08 connected to the line of D.C.output voltage Vout of each D.C./D.C.converter module 5,5A,5B.

Further, to the output terminals ION1 to ION8 of said power supply monitoring module 8 are connected control terminals CNT of D.C./D.C.converter modules 5,5A,5B, from which are supplied control signals which can perform on/off control of discrete D.C./D.C.converter modules 5,5A, 5B. Whereas, to the power supply monitoring module 8 is connected control module 9 integrating a micro computer which comprises CPU, P-ROM, input/output interface, and the like, and said converter modules are controlled in a preset condition in accordance with programs pre-written on said control module 9. In which are further provided additional functions such as display function for indicating the channel of D.C./D.C.converters 5,5A,5B causing abnormal operation, D.C.output voltage Vout and D.C.currents variable function for each D.C./D.C.converter module 5,5A,5B.

Hereinafter is explained lay-out structure of the present Power supply with reference to FIGS. 2 and 3.

FIG. 2 shows a noise filter module 3, a power factor and harmonic correction module 4, D.C./D.C.converters 5,5A, 5B,5C,5D laterally lined up in sequence.

In this case, multi-outputs power supply can be provided by combining power factor and harmonic correction module 4 of 1 KW output power, D.C./D.C.converter 5 of 300 W output power, D.C./D.C.converters 5A,5B of 150 W output power, D.C./D.C.converters 5C,5D, of 75 W output power one another. What is characteristic here is that each module 3,4,5,5A,5B,5C,5D is formed with each one-side portion 11 having the same length and height, while each of them is formed with each other-side portion 12 having various lengths depending upon output voltage or the like applied thereto. And each bottom portion of each module 3,4,5,5A, 5B,5C,5D is formed with each metal core board (not shown) on which various electronics components are to be mounted. Further, each module has each cover 13 for covering over said each metal cord board, each press-in nut 14 with each screw hole for mounting the same to chassis or the like, and each terminal portion 15 which enables the same to be connected to the external thereof.

On the other hand, FIG. 3 shows an approximately square-shaped Power Supply by suitably combining a noise filter module 3, a power factor and harmonic correction module 4, D.C./D.C.converters 5,5A. For this case, for example, a power factor and harmonic correction module 4 of 500 W output power and D.C./D.C.converters 5,5A of 150 output power are employed. Incidentally, although not shown in the drawings, back-up power supply module 7 or the like can be packaged into the same shape as said each module 3,4,5,5A, whereby it can be layed out on the same plane along with other modules.

Again referring to FIG. 1, during inputting A.C.power source 1, detection signals will be supplied from detection terminal ENB to power supply monitoring module 8 when D.C.input voltage Vin2 reaches a preset voltage level. At this time, said power supply monitoring module 8 forces each D.C./D.C.converter module 5,5A,5B to stop operating for preset time through control terminals CNT, suppressing the secondary rush current from power factor and harmonic correction modules 4,4A. Further, said power supply monitoring module 8 constantly monitors A.C.input voltage Vin1, D.C.input voltage Vin2, and D.C.output voltage Vout, thus in case of abnormal operation, said power supply monitoring module 8 displays the channel of faulty D.C./D.C.converters 5,5A,5B, and where necessary, each D.C./D.C.converter is forced to stop operating.

As hereinabove described, according to the present embodiment, main parts constructing a Power Supply are divided into a noise filter module 3, power factor and harmonic correction module 4, D.C./D.C.converter module 5, and back-up power supply module 7 respectively, in order to be independently modularized. With the structure thus made, a user can optionally and easily combine each module to design Power Supply Systems with various specifications in accordance with the objects thereof. Further, each module 3,4,5,7 is formed with one-side portion 11 having the same length and height, thus there will appear no stepped portion in both the lateral and vertical directions on lined-up modules 3,4,5,5A,5B,5C,5D shows in FIG. 2 and square-shaped modules 3,4,5,5A shown in FIG. 3. Accordingly, the present Power Supply is extremely easy to operate and use for users, and general configuration of Power Supply is free to change depending upon the housing space thereof. Furthermore, since power supply monitoring module 8 having control module 9 is connected to the designed Power Supply, a user can promptly cope with disorete abnormal operations cased therewithin.

Figure 4:
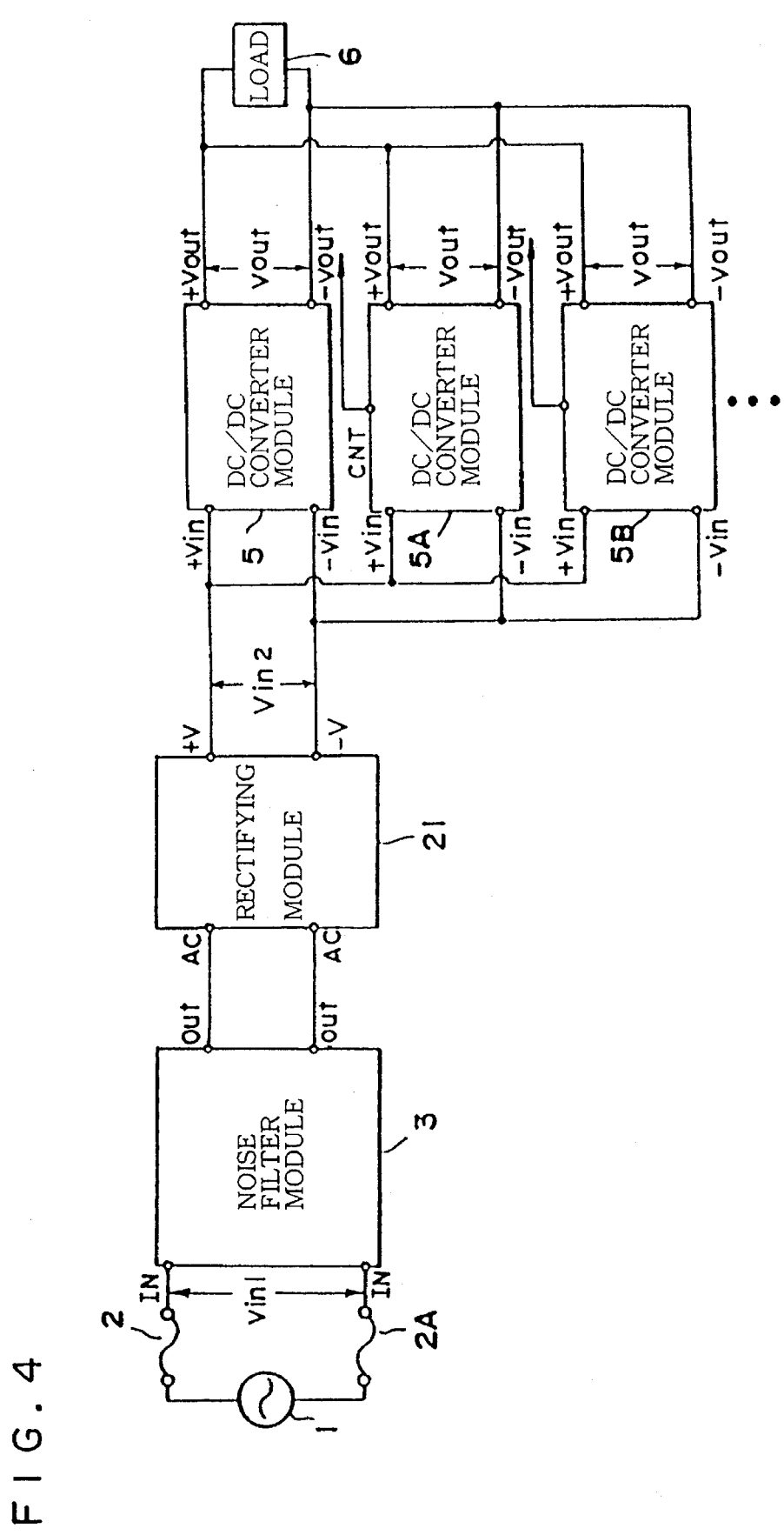
FIG. 4 is a circuit diagram showing a second embodiment of a Power Supply of the present invention.

In FIG. 4 showing a second embodiment of the present invention, the same portions as those of forgoing embodiment is designated as common reference numerals, and their repeated detail description will be omitted.

In the second embodiment, said power factor and harmonic correction modules 4,4A are replaced with rectifying module 21 which rectifies and smoothes A.C.input voltage Vin1 applied to input terminals AC so that D.C.input voltage Vin2 will be output from output terminals +V,−V. Here, like aforesaid embodiment, said rectifying module 21 is formed with one-side portion having the same length and height as another module, such as that of noise filter module 3, whereby the same effect and action as described in the first embodiment can be obtained.

Incidentally, the present invention should not be limited to the embodiments thus far described, it can be modified within a scope of the invention. For example, circuit structure within a D.C./D.C.converter module may be variously modified depending upon output power or the like.

What is claimed:

1. A power supply constructed by combining a plurality of modules, comprising:

a noise filter module for rejection of noises from A.C. input voltage line;

a rectifying module which rectifies and smooths said A.C. input voltage from said noise filter module;

power converter modules for converting rectified and smoothed D.C. voltage from said rectifying module into preset D.C. output voltage, wherein there are provided plural types of modules with respect to at least said power converter modules, such that one or more power converter modules can be selectively combined, corresponding to a specification of the power supply, wherein said modules are independently packaged with respect to main components constructing the power supply, each having one or more terminals which allow the main component to be connected to the other components.

2. A power supply constructed by combining a plurality of modules according to claim 1, wherein each module has approximately square-shaped or rectangular-shaped configuration respectively, and is formed with one-side thereof having the same length and height.

3. A power supply constructed by combining a plurality of modules, comprising:

a noise filter module for rejection of noises from A.C. input voltage line;

power factor and harmonic correction modules for bringing the current and voltage waveforms of said A.C. input voltage from said noise filter module close to each other;

power converter modules for converting regulated D.C. input voltage from said power factor and harmonic correction module into preset D.C. output voltage;

a back-up power supply module for supply of substitute D.C. voltage to said power converter modules in case of abnormal stop of the supply of said regulated D.C. input voltage from said power factor and harmonic correction module, wherein there are provided plural types of modules with respect to at least said power factor and harmonic correction modules and power converter modules, such that one or more power factor and harmonic correction modules can be selectively combined with one or more power converter modules, corresponding to a specification of the power supply, wherein said modules further comprises a power supply monitoring module having a control module therein to simultaneously monitor the input and output side of the power supply, and wherein said modules are independently packaged with respect to main components constructing the power supply, each having one or more terminal which allow the main component to be connected to the other components.

4. A power supply constructed by combining a plurality of modules, comprising:

a noise filter module for rejection of noises from A.C. input voltage line;

power factor and harmonic correction modules for bringing the current and voltage waveforms of said A.C. input voltage from said noise filter module close to each other;

power converter modules for converting regulated D.C. voltage from said power factor and harmonic correction module into preset D.C. output voltage, wherein there are provided plural types of modules with respect to at least said power factor and harmonic correction modules and said power converter module, such that one or more of said power factor and harmonic correction modules can be selectively combined with one or more of said power converter modules, corresponding to a specification of the power supply, and wherein said modules are independently packaged with respect to main components constructing the power supply, each having one or more terminals which allow the main component to be connected to the other components.

5. A power supply constructed by combining a plurality of modules according to claim 4, further comprising a back-up power supply module for supply of substitute D.C. voltage to said power converter modules in case of abnormal stop of the supply of said regulated D.C. input voltage from said power factor and harmonic correction modules.

6. A power supply constructed by combining a plurality of modules according to claim 5, wherein each module has approximately square-shaped or rectangular-shaped configuration respectively, and is formed with one-side thereof having the same length and height.

7. A power supply constructed by combining a plurality of modules according to claim 4, wherein each of said modules has an approximately square-shaped or rectangular-shaped configuration respectively, and is formed with one-side thereof having the same length and height.

8. A power supply constructed by combining a plurality of modules according to claim 4, wherein said power converter modules each have different output characteristics, and are combined for multi-output operation.

9. A power supply constructed by combining a plurality of modules according to claim 4, wherein said plural power converter modules each have the same output characteristics, and are combined for parallel operation.

* * * * *